US008489934B2

(12) United States Patent
Boardman et al.

(10) Patent No.: US 8,489,934 B2
(45) Date of Patent: Jul. 16, 2013

(54) MESSAGING SYSTEM

(75) Inventors: Paul S Boardman, Warrington (GB); Steven J Smith, Westcroft (GB); David L Tullett, Epsom (GB)

(73) Assignee: British Telecommunications public limited company, London (GB)

( * ) Notice: Subject to any disclaimer, the term of this patent is extended or adjusted under 35 U.S.C. 154(b) by 195 days.

(21) Appl. No.: 12/303,815

(22) PCT Filed: Jun. 7, 2007

(86) PCT No.: PCT/GB2007/002086
§ 371 (c)(1),
(2), (4) Date: Dec. 8, 2008

(87) PCT Pub. No.: WO2008/001038
PCT Pub. Date: Jan. 3, 2008

(65) Prior Publication Data
US 2010/0205496 A1    Aug. 12, 2010

(30) Foreign Application Priority Data
Jun. 28, 2006    (EP) .................................... 06253381

(51) Int. Cl.
*G06F 11/00*    (2006.01)
(52) U.S. Cl.
USPC .................................... 714/39; 714/1; 714/40
(58) Field of Classification Search
USPC ......................................................... 714/39
See application file for complete search history.

(56) References Cited

U.S. PATENT DOCUMENTS

| | | | |
|---|---|---|---|
| 5,608,874 A | 3/1997 | Ogawa et al. | |
| 5,794,039 A * | 8/1998 | Guck | 1/1 |
| 6,000,041 A * | 12/1999 | Baker et al. | 714/39 |
| 6,047,002 A * | 4/2000 | Hartmann et al. | 370/466 |
| 2003/0061385 A1 | 3/2003 | Gonze | |
| 2005/0192649 A1 | 9/2005 | Shehadeh et al. | |
| 2005/0262472 A1 * | 11/2005 | Wood et al. | 717/102 |

FOREIGN PATENT DOCUMENTS

| | | |
|---|---|---|
| EP | 1 235 160 | 8/2002 |
| EP | 1 235 160 A | 8/2002 |
| WO | 2004/027559 | 4/2004 |
| WO | 2004/027559 A | 4/2004 |

OTHER PUBLICATIONS

European Search Report dated Sep. 13, 2006 in EP 06 25 3381.

(Continued)

*Primary Examiner* — Sarai Butler
(74) *Attorney, Agent, or Firm* — Nixon & Vanderhye P.C.

(57) ABSTRACT

Input messages are received at respective ports (10, 11, 12) of a message controller 4 from a plurality of external devices (100, 110, 120) which use different protocols. When an incoming message arrives at an input port a message object is created, the message object including a label identifying the respective input port. The conversion and subsequent handling of the messages uses program data which is retrieved from a program data store (5) according to the label indicating the input port. The program data retrieved is thus specified by the input port and allows conversion of messages into a common protocol to allow subsequent processing of the messages. This architecture allows the same program data to be called for external devices using the same protocol. Other processes may also be called from the program data store, covering functions such as validation, data enrichment, and exception handling processes.

24 Claims, 3 Drawing Sheets

OTHER PUBLICATIONS

Office Action (1 pg.) dated May 6, 2009 issued in corresponding European Application No. 07 733 098.3.
Applicant Response (2 pgs.) to May 6, 2009 Office Action issued in corresponding European Application No. 07 733 098.3.
Office Action (3 pgs.) dated Apr. 21, 2010 issued in corresponding European Application No. 07 733 098.3.
Applicant Response (2 pgs.) to Apr. 21, 2010 Office Action issued in corresponding European Application No. 07 733 098.3.
Office Action (3 pgs.) dated Oct. 17, 2011 issued in corresponding European Application No. 07 733 098.3.

* cited by examiner

MESSAGING SYSTEM

This application is the U.S. national phase of International Application No. PCT/GB2007/002086 filed 7 Jun. 2007 which designated the U.S. and claims priority to European Patent Application No. 06253381.5 filed 7 Jun. 2006, the entire contents of each of which are hereby incorporated by reference.

BACKGROUND

This invention relates to a messaging system for facilitating sending messages between two or more systems of a group operating on different message formatting protocols. Such systems are useful, for example, in collating data collected by a number of separate systems which do not operate in the same manner.

The incoming messages can be in differing formats dependant on the event and system they are arriving from. Such differences may arise because the systems were not originally developed with any intention of interfacing, or there may be other reasons why full compatibility is not available. For example, different users may have different preferences or requirements, such as the need for their own systems to interface with other equipment. For example, if one of the systems is to monitor overall availability of a service dependant on several different service providers, it may need to connect to each service provider's logging system. In another situation, data generated by one system may be required by another system, for example if two service providers are required to co-operate to provide a service. Such a situation may arise for example if a function needs to be performed by one provider that requires data to be retrieved from a store associated with another, and updated data reporting that operation to be returned to the store.

These service providers may be alternative suppliers of the same goods or service (e.g. two potential sources of the same material) or may be complementary (e.g. material and personnel). However, the service providers may use different equipment, from different manufacturers, and the individual systems need to be compatible with the equipment being monitored.

One example of such use is the operation of a number of co-operating services such as hospitals, doctors' surgeries etc, each of which hold and generate data which others may require, to support patient referrals etc.

If the number of systems, each potentially requiring a capability to interface with any other, is "n", then the number of possible message flows through the messaging system, and therefore interfaces required, is given by n(n−1)—assuming that the requirements for information flow between different systems are not symmetrical. This clearly becomes unmanageable very quickly as numbers increase: it would be a major task to add a new system to the group, or change the specification of an existing one, as it would require reconfiguration of all the existing interconnections. The problem is reduced if systems operating in the same manner can be identified, so that systems using the same protocol can share some resources in the messaging system, but the complexity involved in adding a new system is still significant.

Moreover, if the messages need to be co-ordinated by the messaging system, as well as merely exchanged between the various co-operating systems, a common format is required for the messaging system to be able to do this.

SUMMARY OF PRESENT EXAMPLE EMBODIMENTS

The present invention relates to a message handling system that allows data to be exchanged between such systems, and enables messages to be 'actioned', for example by recording them to detect fault conditions, or by the addition of further data, as they pass through the interface. Fault conditions may be recognisable from the collation of data from several different sources. Such additional data may be required for example because the destination system requires data that is not provided by the originating system, for example a condition that is inherent in the originating system, or is a default condition, may need explicit recital in the message sent to the destination system.

According to the invention, there is provided a method for converting input messages from a plurality of different protocols into a common protocol to allow processing of the messages, wherein program data suitable for said conversion is retrieved from a program data store, and wherein when an incoming message arrives at an input port corresponding to the source of the message, a message object is created, the message object including a label identifying the respective input port, wherein the program data is selected from the store according to the label indicating the input port.

In a preferred arrangement, the program data also specifies the processes to be performed on the messages. This may advantageously be achieved by having the message objects also identify the processes to be performed by the program data. The message objects may also specify destinations to which data is to be delivered, the processes performed by the process data including the preparation of messages to be transmitted to said destinations. This preparation may include the step of converting message objects from the common protocol into one or more different protocols for delivery to respective destinations through respective output ports.

The invention allows the sharing of processing facilities by a plurality of processes converting between different protocols. Moreover, there is only a need to store one copy of each handling process regardless of how many different input systems, using different protocols, make use of it. This has advantages for storage, and also simplifies any upgrade process that may be required.

The actions performed on the translated message object in the common protocol may include enriching and validating the data. New message objects may be generated for delivery to one or more destinations such as a database According to another aspect, there is provided a message handling apparatus having a plurality of input ports for receiving messages in a plurality of different protocols, means for generating a message object, the message object including a label identifying the respective input port, a program data store for storing a plurality of program data suites for converting said messages into a common protocol to allow processing of the messages, and means for selecting program data from the store according to the label indicating the input port such that said messages are converted into a common protocol to allow processing of the messages.

From time to time, situations may occur when the differences between the interacting systems make a required interaction impossible, either through lack of data or a mismatch of capabilities. The interface may be provided with a generic exception-handling process to enable such situations to be reported.

BRIEF DESCRIPTION OF DRAWINGS

An embodiment of the invention will be described by way of example, with reference to the drawings, in which.

DETAILED DESCRIPTION OF PRESENT EXAMPLE EMBODIMENTS

Figure 1:
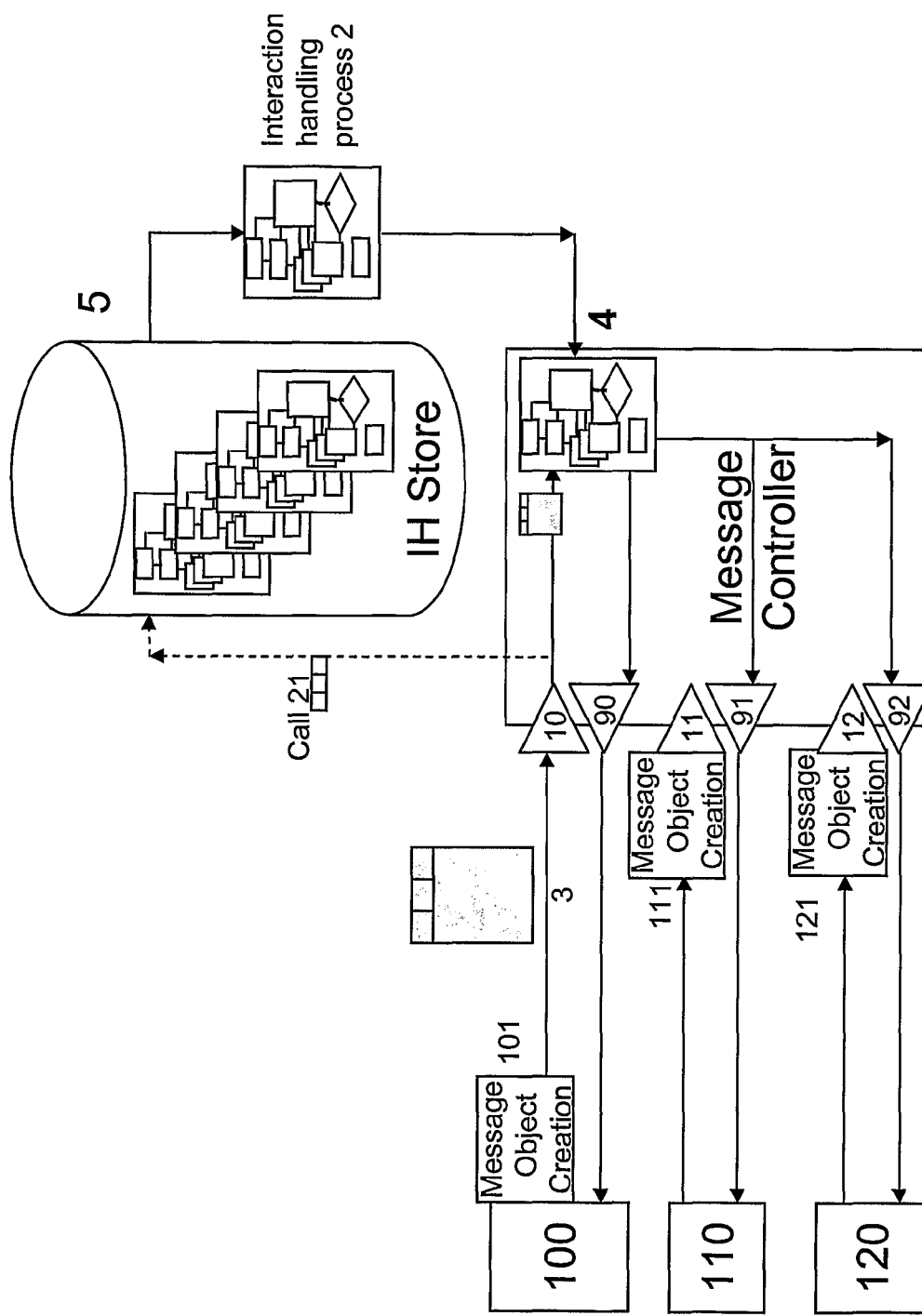
FIG. 1 is a schematic diagram of the functional elements which co-operate to perform the invention.

FIG. 1 is a schematic illustration of the various elements that co-operate to form this embodiment of the invention. The system comprises a message controller 4 for processing data received from a number of external systems 100, 110, 120. An associated program store 5 maintains process data to be retrieved by the message controller 4.

The external systems 100, 110, 120 may be systems for reporting data for transmission to some other point, fault conditions, or any other properties. Each external system conditions may operate according to protocols and formats suitable for the conditions it is to work under, the equipment available, and any other uses to which it is to be put. Each external system 100, 110, 120 is connected to the message controller through respective input portals 10, 11, 12 and output portals 90, 91, 92. The external systems 100 etc may include message object creation means 101 which generate certain header information for each message transmitted, as will be described later with reference to FIG. 3. Alternatively, the respective input ports 11, 12 of the message controller may have an associated message object creation means 111, 121 performing a similar function.

Figure 2:
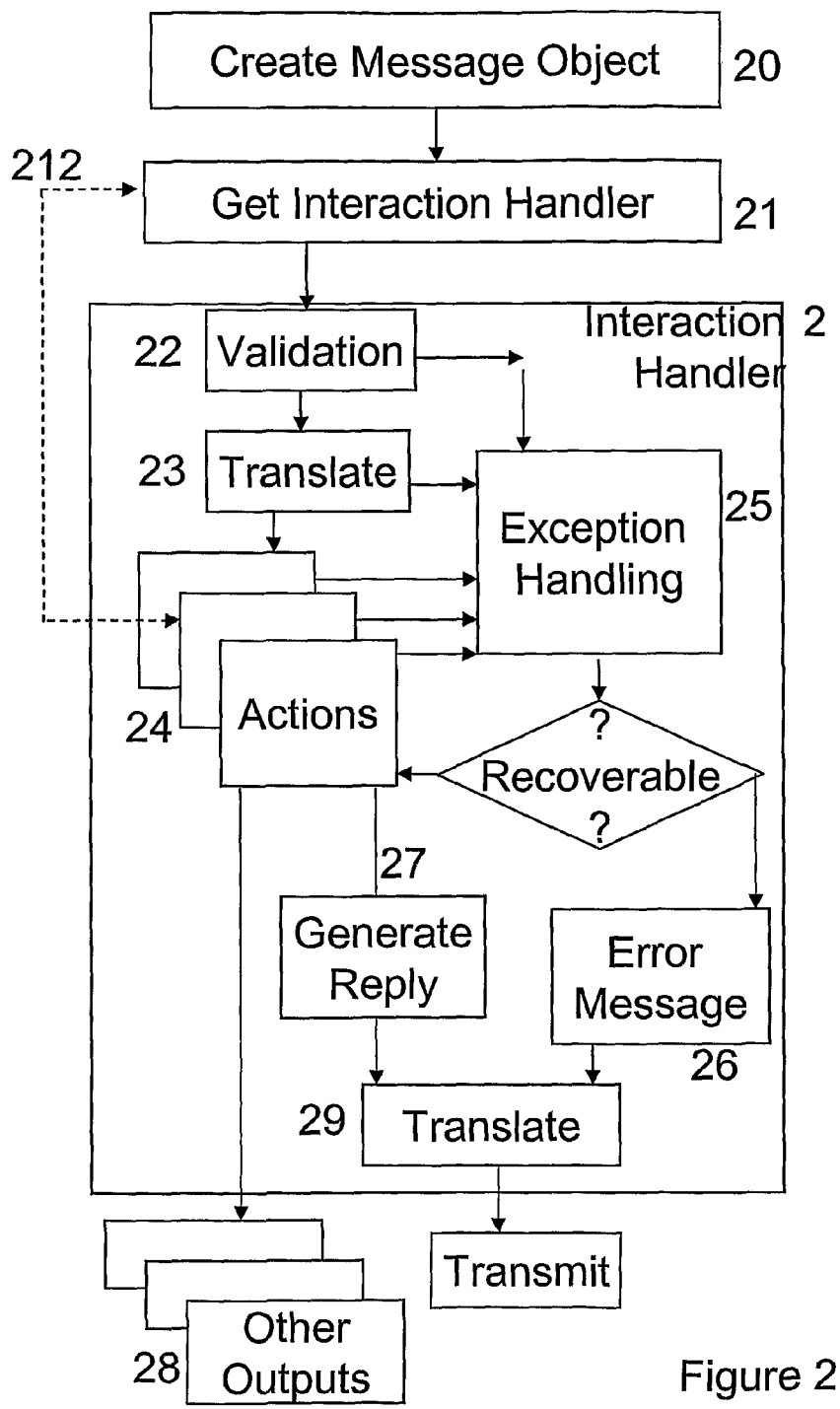
FIG. 2 is a flow diagram illustrating the processing of a message
Figure 3:
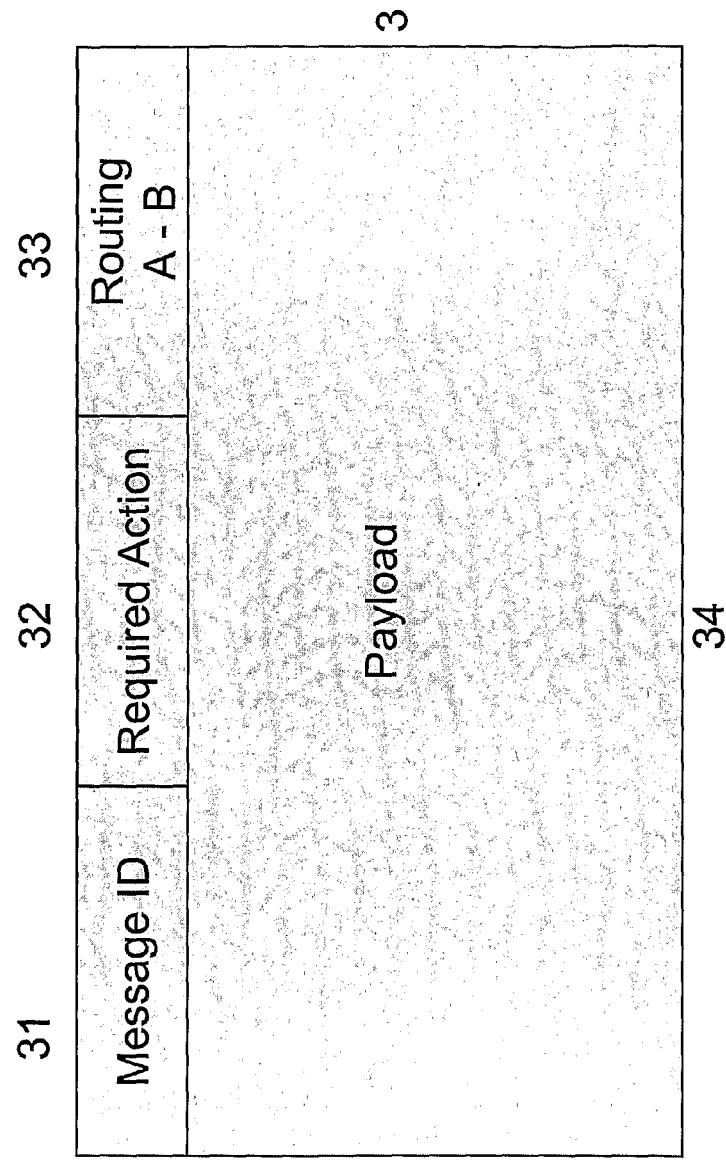
FIG. 3 is a schematic diagram of a message object used in the invention.

Referring to FIGS. 2 and 3, when a message is to be sent to the message controller 4, a message object is first created (step 20). In addition to the actual message payload 34 itself, this message object 3 contains a unique identifier 31, an indication 32 as to the purpose of the message (the action to be performed on it), and an indication 33 of the origin of the message. This information is either provided by the originating external system 100, or at the input portal 11, 12. In either case, the creation function 101, 111, 121, is specific to the external system 100 (or its associated port 11, 12) and can therefore be compatible with the formats that it uses. Moreover, the origin of the message is readily identified at this point as the message creation process is specific to either the external process 100 or the input port 110, 120.

Instead of using extrinsic characteristics of a message, such as the port at which the message is received, the object creation function may generate a message object from intrinsic characteristics of the message. In this case the message controller calls a "Visit" function: such a function generates an output dependant on the content of the message to which it is called, and specifically on the format of that message.

The information 31, 32, 33 is generated by the object creation function in a common messaging format, to be used throughout the rest of the message controller 4. This allows a single message controller 4 to interface with a large number of disparate external systems The message object 3 received at the portal 10, 11, 12 is now passed to the message controller 4. The message controller transmits a call (21) to the program store 5. This call includes at least the header information 31, 32, 33 from the message object. The program store 5 holds a concordance between the identities of the input ports 10, 11, 12, as identified by the header information 33, and the individual transformation programmes appropriate to inputs from their respective external systems 100, 110, 120. There may be more than one transformation programme associated with the same port, depending on the type of the actual message received. If this is the case, the transformation processor 2 analyses the required action field 32 to determine the type of event.

The transformation programmes may be stored either in the form in which they are to be used, or as a configuration file indicating how such a programme is to be compiled.

From the header information the store 5 identifies the required program data 2, and returns this program data to the message controller 4. The message controller 4 now has the program data 2 appropriate for processing the message 3, according to the characteristics of the source and destination of the message (specified by the routing 33) and the action 32 required.

FIG. 2 depicts a typical interaction handler 2 that might be downloaded to the message controller. The number of steps may vary, and the details of the individual processes 2 etc stored in the store 5 will depend on the characteristics of the external systems 100, 110, 120 identified by the header information 31, 32, 33. As shown in FIG. 2, the message object is first validated (step 22) to check that the message is correctly formatted for the program 2 that has been called, in particular to check that the payload 34 is compatible with the actions that are to be performed by the interaction handler. It should be noted that the portal 10, 11, 12 and the generic parts of the message controller 2, can only handle the header information 31, 32, 33 in the message object. Although the message object creation function 101, 111, 121 may need to read part of the payload 34 in the original message, in order to determine the correct "required action" field 32, but it does not undertake a full validation. The validation function 22 also guards against data corruption in the link between the external systems 100, 110, 120 and the message controller 4.

The message payload 34 is now translated 23 into a processing language in which the various actions 24 can be performed. Each translation program 23 translates a protocol used by one (or more) of the external processors 100, 110, 120 into a common processing language which is to be used for the actions 24 to be performed on the translated message. The use of the common language allows the action processes to be developed and updated more efficiently, as the process only needs to be performed once, rather than separately for each external system 100, 110, 120.

The interaction handler next performs one or more actions 24 specified by the interaction handler 2. Such actions may include the manipulation of data contained in the payload 34, for example standardising the way in which data is presented (e.g. month/day/year, or day-month-year). Tabular information may need to be organised into a common format, and grading levels normalised (for example if one system has three levels of priority and another has only two).

Some data may not be explicit in the message received, but be inherent from the origin of the message, which can be determined from the header message applied by the portal 10. For example, some systems may generate numerical data in imperial units and others in metric: the interaction handler may add the appropriate units, or convert all the data to a common system, in accordance with the portal (and hence the external system) from whence the data originated.

Messages from different sources may have similar form and content may require the interaction handler to respond in different ways: for example a message from a safety-critical system may be forwarded to a specified destination whilst a similar message from another system may merely be forwarded to a database for recording, or to an external system for correlating such messages to identify network errors or other conditions not apparent from the data of any single external system on its own.

Other actions 24 may include:
- forwarding the message, or a new message derived therefrom, to one or more of the external devices 100, 110, 120,
- collating the payload data 34 with data received in previous or subsequent messages from the same or different sources,
- logging the message,
- placing data on a database,
- retrieving data from a database.

Because any incoming message is converted by the translation process 23 to a common format, such actions 24 can be called in more than one of the interaction handlers 2. This shared functionality substantially reduces the complexity of the system. Actions common to more than one interaction handler may be stored separately in the store, and called by a separate function call 212 from the interaction handler 2.

The action 24 includes the generation of an acknowledgement of other reply 27 for transmission to the originating system 100. A translation process 29 identifies, through the routing information 33 or otherwise, the destination portal 90 to which this message is to be sent, and thus what translation process is required.

From time to time data may be received which, for some reason, cannot be processed to generate the required output. Such data is identified by the interaction handler 4 and passed to an exception handler 25. The exception handler 25 is used by the interaction handler 2 to deal with exceptions as they occur whilst the message is being processed, dependant on the exception type and the location the exception occurred. When an exception is identified the message is passed to the exception handler, together with an "exception object" indicative of the reason that it cannot be processed. The exception handler 25 determines what action to take, either to recover and continue processing, or to fail the transaction. Recovery may require the reporting of an error message 26 to the origin of the failed message system, requesting re-transmission of the message. The message Identity 31 is included in the report.

The actions 24 may also require messages to be sent to one or more of the external systems 110, 120 other than the originating system 100. This may involve forwarding a new message 28 (or the original message, perhaps in modified form) to other external systems. Outputs 28, configured for the respective destination terminals 100, 110, 120 can thus be generated and transmitted. Such actions 24 would include the calling of the appropriate translation processes for transmission to each external source.

Several external systems 100, 110 may use the same protocol. In such cases the identities of their associated input and output ports 10, 11; 90, 91 would correspond to the same interaction handler 2 in the store 5, so the same programme would be retrieved. Should a new external system 120 join the group, or an existing one change its processing system, the required operating system is reported to the store 5 such that the concordance can be updated accordingly. If the interaction process is already available in the stores 5 (because another system (e.g. 100) also uses it, no further action is required. If the interaction process is not one of those already maintained in the store 5 it must be loaded to that store. However, once it is in the store, it is available for use by any other external system that may become connected at a later stage and uses the same operating protocols.

As will be understood by those skilled in the art, the invention may be implemented on a general purpose computer, and the program data can be maintained on various transmission and/or storage mediums such as a floppy disc, CD-ROM, or magnetic tape so that the program data can be loaded onto a processor of the computer.

The invention claimed is:

1. Method for converting input messages from a plurality of different protocols, received by a message handling apparatus having a plurality of input ports, into a common protocol to allow processing of the messages using program data suitable for said conversion retrievable from a program data store, wherein when an incoming message arrives at an input port corresponding to the source of the message, a message object is created, the message object including a label identifying the respective input port, and wherein the program data is selected from the store according to the label indicating the input port.

2. Method according to claim 1, wherein the program data also specifies the processes to be performed on the messages.

3. Method according to claim 2, wherein the message objects also identify the processes to be performed by the program data.

4. Method according to claim 3, wherein the message objects specify destinations to which data is to be delivered, and the processes performed by the program data include the preparation of messages to be transmitted to said destinations.

5. Method according to claim 4, wherein the program data includes the step of converting message objects from the common protocol into one or more different protocols for delivery to respective destinations through respective output ports.

6. Method according to claim 1, in which an exception handling process is retrievable from the program store for processing messages that cannot otherwise be processed, and recovering or reporting failure to process such messages.

7. Method according to claim 6, wherein the exception handling process to be recovered is selected from a plurality of such processes according to the route and/or event to be processed.

8. The method according to claim 1, wherein the program data store stores a concordance between respective identities of the input ports and selectable program data suitable for said conversion, and the program data store receives message objects, each having a label identifying a corresponding input port, respectively from the input ports.

9. Message handling apparatus having a plurality of input ports for receiving messages in a plurality of different protocols, means for generating a message object after receipt of at least a respective one of the messages on a respective input port, the message object including a label identifying the respective input port, a program data store for storing a plurality of program data suites for converting said messages into a common protocol to allow processing of the messages, and means for selecting program data from the store according to the label indicating the input port such that said messages are converted into a common protocol to allow processing of the messages.

10. Apparatus according to claim 9, wherein the program data also specifies the processes to be performed on the messages.

11. Apparatus according to claim 10, wherein the message objects also identify the processes to be performed by the program data.

12. Apparatus according to claim 11, wherein the message objects specify destinations to which data is to be delivered, and the processes performed by the process data include the preparation of messages to be transmitted to said destinations.

13. Apparatus according to claim 12, comprising means for converting message objects from the common protocol into one or more different protocols for delivery to respective destinations through respective output ports.

14. Apparatus according to claim 9, further comprising an exception handling means retrievable from the program store for processing messages that cannot otherwise be processed, and recovering or reporting failure to process such messages.

15. Apparatus according to claim 14, including means for selecting an exception handling means from a plurality of such means according to the route and/or event to be processed.

16. The apparatus according to claim 9, wherein the program data store is configured to store a concordance between respective identities of the input ports and program data suites for converting said messages into the common protocol, and the program data store is configured to receive message objects, each having a label identifying a corresponding input port, respectively from the input ports.

17. A non-transitory computer readable medium storing instructions which upon execution by a computer perform a method, the method comprising:
   receiving input messages, having a plurality of different protocols, at a plurality of input ports;
   creating a message object after at least one of the input messages has been received, the message object including an identifier corresponding to the respective input port at which the at least one input message has been received;
   selecting program data based on the identifier corresponding to the respective input port at which the at least one input message has been received; and
   using the selected program data to translate the at least one input message that has been received to a protocol which is common to the plurality of different protocols to allow processing of the at least one input message.

18. The non-transitory computer readable medium according to claim 17, wherein the program data specifies the processes to be performed on the at least one input message.

19. The non-transitory computer readable medium according to claim 18, wherein the message object identifies one or more processes to be performed by the program data.

20. The non-transitory computer readable medium according to claim 19, wherein the message object specify destinations to which data is to be delivered, and the one or more processes performed by the program data include the preparation of at least one message to be transmitted to said destinations.

21. The non-transitory computer readable medium according to claim 20, wherein the program data enables the message object to be converted from the common protocol into one or more different protocols for delivery to respective destinations.

22. The non-transitory computer readable medium according to claim 17, wherein the method further comprises retrieving an exception handling process and processing the messages that cannot otherwise be processed, and recovering or reporting failure to process such messages.

23. The non-transitory computer readable medium according to claim 22, wherein the exception handling process to be recovered is selected from a plurality of such processes according to a route and/or event to be processed.

24. The non-transitory computer readable medium according to claim 17, further comprising storing, in a storage memory, a concordance between respective identifiers of the input ports and selectable program data for translating input messages into the common protocol; and receiving message objects, each having an identifier identifying a corresponding input port, respectively from the input ports at the storage memory.

* * * * *

UNITED STATES PATENT AND TRADEMARK OFFICE
CERTIFICATE OF CORRECTION

PATENT NO.       : 8,489,934 B2                         Page 1 of 1
APPLICATION NO. : 12/303815
DATED            : July 16, 2013
INVENTOR(S)      : Boardman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 157 days.

Signed and Sealed this
Eighth Day of September, 2015

Michelle K. Lee
*Director of the United States Patent and Trademark Office*